US011189981B2

(12) United States Patent
Yoshida

(10) Patent No.: US 11,189,981 B2
(45) Date of Patent: Nov. 30, 2021

(54) DEVICE FOR INSERTING FLEXIBLE MEMBER

(71) Applicant: Samsung Display Co., LTD., Yongin-si (KR)

(72) Inventor: Futoshi Yoshida, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 21 days.

(21) Appl. No.: 16/572,735

(22) Filed: Sep. 17, 2019

(65) Prior Publication Data

US 2020/0169054 A1 May 28, 2020

(30) Foreign Application Priority Data

Nov. 22, 2018 (KR) ........................ 10-2018-0145094

(51) Int. Cl.

| | |
|---|---|
| ***B23P 19/00*** | (2006.01) |
| ***H01R 43/26*** | (2006.01) |
| *H01R 12/77* | (2011.01) |
| *H01R 12/70* | (2011.01) |

(52) U.S. Cl.

CPC ......... *H01R 43/26* (2013.01); *H01R 12/7076* (2013.01); *H01R 12/77* (2013.01); *Y10T 29/53174* (2015.01)

(58) Field of Classification Search

CPC ........ H01R 24/50; H01R 12/77; H01R 12/89; H01R 12/85; G02F 1/133305; H05K 1/147; H05K 1/11; H05K 1/028; H05K 1/118; Y10T 29/53174

USPC ......... 29/739, 729, 743, 744, 747, 832, 842, 29/845, 874

See application file for complete search history.

(56) References Cited

U.S. PATENT DOCUMENTS

| | | | | |
|---|---|---|---|---|
| 7,553,183 | B2 | 6/2009 | Taketomi et al. | |
| 9,214,749 | B2 * | 12/2015 | Li | H05K 7/1489 |
| 2013/0083505 | A1 * | 4/2013 | Kobayashi | H05K 1/11 361/785 |
| 2014/0045383 | A1 | 2/2014 | Fujii | |

FOREIGN PATENT DOCUMENTS

| | | | |
|---|---|---|---|
| JP | H7-42044 | U | 7/1995 |
| JP | 11185894 | A | 7/1999 |
| JP | 200435018 | A | 2/2004 |
| JP | 4996226 | B2 | 5/2012 |
| JP | 2014-35795 | A | 2/2014 |
| KR | 1020070023823 | A | 2/2007 |

* cited by examiner

*Primary Examiner* — Thiem D Phan

(74) *Attorney, Agent, or Firm* — Cantor Colburn LLP

(57) ABSTRACT

A device for inserting a flexible printed circuit board into a connector includes: a gripper to which the flexible printed circuit board is securable; a deformer movably connected to the gripper; and a transporter connected to the gripper and the deformer. Movement of the deformer relative to the gripper, applies a transformation force from the deformer to a portion of the flexible printed circuit board to bend the portion about edges of the gripper, and transportation of the transporter transports the gripper together with the flexible printed circuit board which has the portion of the flexible printed circuit board which is bent about the edges of the gripper, toward the connector, and inserts the flexible printed circuit board into the connector.

15 Claims, 10 Drawing Sheets

DEVICE FOR INSERTING FLEXIBLE MEMBER

This application claims priority to Korean Patent Application No. 10-2018-0145094, filed on Nov. 22, 2018, and all the benefits accruing therefrom under 35 U.S.C. § 119, the disclosure of which is incorporated by reference herein in its entirety.

BACKGROUND

1. Field

Embodiments of the invention relate to a device with which a flexible printed circuit board ("FPCB") is coupled to another component and to a method of inserting a FPCB. More particularly, embodiments of the invention relate to a device which secures a rigidity of a FPCB when the FPCB is inserted to a connector of a display panel, to simplify insertion of the FPCB into the connector, and to a method of inserting the FPCB using the device.

2. Description of Related Art

Flexible printed circuit boards ("FPCB") are used for internal wirings of advanced electronic devices such as smart phones, personal digital assistants ("PDAs"), notebooks, and digital cameras.

Electronic devices are fitted with elements that operate while transmitting and receiving signals, to and from a controller, respectively. Such elements are connected to the controller through a FPCB. That is, each element is connected to a FPCB, and a connector which is connected to the controller is provided as a connection member by which the FPCB and the connector are connected to each other.

SUMMARY

Embodiments of the invention are directed to a device for inserting a flexible member such as a flexible printed circuit board ("FPCB") into a component such as a connector of a display panel, which secures a rigidity of the FPCB in an inserting direction during insertion of the FPCB to the connector of the display panel, and to a method of inserting the FPCB using the device.

According to an embodiment, a device for inserting a flexible printed circuit board into a connector includes: a gripper to which the flexible printed circuit board is securable; a deformer movably connected to the gripper; and a transporter connected to the gripper and the deformer. Movement of the deformer relative to the gripper which has the flexible printed circuit board secured thereto, applies a transformation force from the deformer to a portion of the flexible printed circuit board to bend the portion of the flexible printed circuit board about edges of the gripper, and transportation of the transporter transports the gripper together with the flexible printed circuit board which has the portion bent about the edges of the gripper, toward the connector, and inserts the flexible printed circuit board into the connector.

The gripper may include: a first pressing portion facing a second pressing portion. Securing of the flexible printed circuit board by the gripper may dispose the first pressing portion contacting a first surface of the flexible printed circuit board; and may dispose a second pressing portion contacting a second surface of the flexible printed circuit board which is opposite to the first surface.

The gripper may have a width less than a width of the flexible printed circuit board.

The device may further include: a first actuator connected to the gripper. Actuation of the first actuator may press the first pressing portion against the first surface of the flexible printed circuit board, and press the second pressing portion against the second surface of the flexible printed circuit board.

The first actuator may apply a substantially equal force to the first pressing portion and the second pressing portion.

The deformer may include: a slider movable with respect to the gripper; and a first actuator connected to the slider.

The slider may have a width greater than a width of the gripper.

A width of the slider may be less than or substantially equal to a width of the flexible printed circuit board.

The slider may include: a first stroke and a second stroke which face each other with respect to each of the first pressing portion and the second pressing portion of the gripper disposed therebetween. The first stroke may be spaced apart from the first pressing portion and the second stroke may be spaced apart from the second pressing portion.

A height difference between the slider and the first pressing portion may be less than a distance between the first stroke and the first pressing portion or a distance between the second stroke and the first pressing portion.

The transformation force applied from the first stroke may be equal to the transformation force applied from the second stroke.

The transporter may include: a base frame coupled to the gripper and the deformer; a transportation frame movably coupled to the base frame; a first linear guide which slidably couples the base frame and the transportation frame to each other; a transportation buffer connected between the transportation frame and the base frame; and a driver with which a driving force is provided to the transportation frame.

The transporter may further include: a second linear guide which slidably couples the base frame to the gripper.

The gripper may include: a holder with which the flexible printed circuit board is secured to the gripper.

The holder secures the flexible printed circuit board to the gripper by using one of a vacuum force and an electrostatic force.

According to another embodiment, a device for inserting a flexible printed circuit board into a connector includes: a gripper to which the flexible printed circuit board is securable; a transporter movably connected to the gripper; and a rotator connected to the gripper and by which the gripper is rotatable by a predetermined angle. Transportation of the transporter transports the gripper together with the flexible printed circuit board which is secured to the gripper, toward the connector.

Transportation of the gripper together with the flexible printed circuit board which is secured to the gripper may dispose a fore-end portion of the flexible printed circuit board into an inlet of the connector, and rotation of the rotator may rotate the gripper together with the flexible printed circuit board which has the fore-end portion disposed in the inlet of the connector, by the predetermined angle.

The transportation of the gripper together with the flexible printed circuit board which is secured to the gripper may further dispose the fore-end portion of the flexible printed circuit board at an insertion end position of the connector, and counter-rotation of the rotator may counter-rotate the gripper together with the flexible printed circuit board which has the fore-end portion at the insertion end position of the connector, by the predetermined angle.

A method of inserting a flexible printed circuit board into a connector includes: a gripper securing a flexible printed circuit board thereto; a deformer transforming a portion of the flexible printed circuit board relative to the gripper; and a transporter transporting the gripper together with the flexible printed circuit board which has the portion transformed relative to the gripper, to insert the flexible printed circuit board into the connector.

In the method, the deformer transforming a portion of the flexible printed circuit board may include: the deformer moving relative to the gripper and toward the flexible printed circuit board which is secured to the gripper, to apply a force to the flexible printed circuit board which is secured to the gripper and bend the portion of the flexible printed circuit board relative to edges of the gripper.

The foregoing is illustrative only and is not intended to be in any way limiting. In addition to the illustrative embodiments and features described above, further embodiments and features will become apparent by reference to the drawings and the following detailed description.

BRIEF DESCRIPTION OF THE DRAWINGS

A more complete appreciation of the invention will become more apparent by describing in detail embodiments thereof with reference to the accompanying drawings, where.

DETAILED DESCRIPTION

Figure 1:
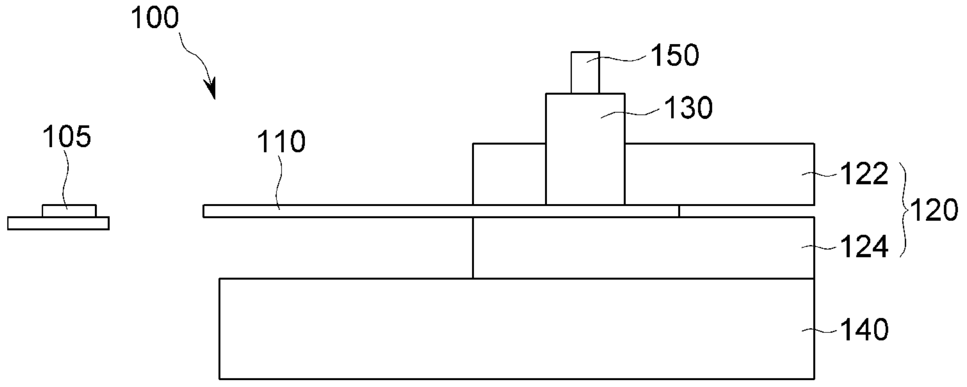
FIG. 1 is a cross-sectional view of an embodiment a device with which a flexible member is insertable into a component.

Embodiments will now be described more fully hereinafter with reference to the accompanying drawings. Although the invention may be modified in various manners and have several embodiments, embodiments are illustrated in the accompanying drawings and will be mainly described in the specification. However, the scope of the invention is not limited to the embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being related to another element such as being “on” or “below” another layer, area, or plate, it may be directly on the other layer, area, or plate, or intervening layers, areas, or plates may be present therebetween. Conversely, when a layer, area, or plate is referred to as being related to another element such as being “directly on” or “directly below” another layer, area, or plate, intervening layers, areas, or plates may be absent therebetween.

The spatially relative terms “below,” “beneath,” “lower,” “above,” “upper” and the like, may be used herein for ease of description to describe the relations between one element or component and another element or component as illustrated in the drawings. It will be understood that the spatially relative terms are intended to encompass different orientations of the device in use or operation, in addition to the orientation illustrated in the drawings. For example, in the case where a device illustrated in the drawing is turned over, the device positioned “below” or “beneath” another device may be placed “above” another device. Accordingly, the illustrative term “below” may include both the lower and upper positions. The device may also be oriented in the other direction and thus the spatially relative terms may be interpreted differently depending on the orientations.

Throughout the specification, when an element is referred to as being “connected” to another element, the element may be “mechanically connected” or “physically connected” to the other element, or “electrically connected” to the other element with one or more intervening elements interposed therebetween.

The terminology used herein is for the purpose of describing particular embodiments only and is not intended to be limiting. As used herein, the singular forms “a,” “an,” and “the” are intended to include the plural forms, including “at least one,” unless the content clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises,” “comprising,” “includes” and/or “including,” when used in this specification, specify the presence of stated features, integers, steps, operations, elements, and/or components, but do not preclude the presence or addition of one or more other features, integers, steps, operations, elements, components, and/or groups thereof.

It will be understood that, although the terms “first,” “second,” “third,” and the like may be used herein to describe various elements, these elements should not be limited by these terms. These terms are only used to distinguish one element from another element. Thus, “a first element” discussed below could be termed “a second element” or “a third element,” and “a second element” and “a third element” may be termed likewise without departing from the teachings herein.

“About” or “approximately” as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10% or 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined at the present specification.

Some of the parts which are not associated with the description may not be provided in order to specifically describe embodiments of the invention. Like reference numerals refer to like elements throughout the specification.

A flexible printed circuit board ("FPCB") of a display device is connectable to a connector in an insertion manner, by which the FPCB is insertable into the connector while the FPCB is in a relatively flat state to facilitate ease of insertion in to the connector. For example, insertion of the FPCB into the connector to connect the FPCB and the connector to each other may include insertion of a distal end or a fore-end portion of the FPCB to a corresponding end portion of the connector.

However, maintaining the relatively flat state of the FPCB and insertion of the FPCB into the connector may be difficult due to a flexible and relatively thin structure of the FPCB. Accordingly, insertion of the FPCB into the connected may be incomplete and/or a connection therebetween may not be sufficient to allow transmission and receiving of signals to and from the connector.

Hereinafter, embodiments of the invention will be described with reference to FIGS. 1 to 12.

Figure 2:
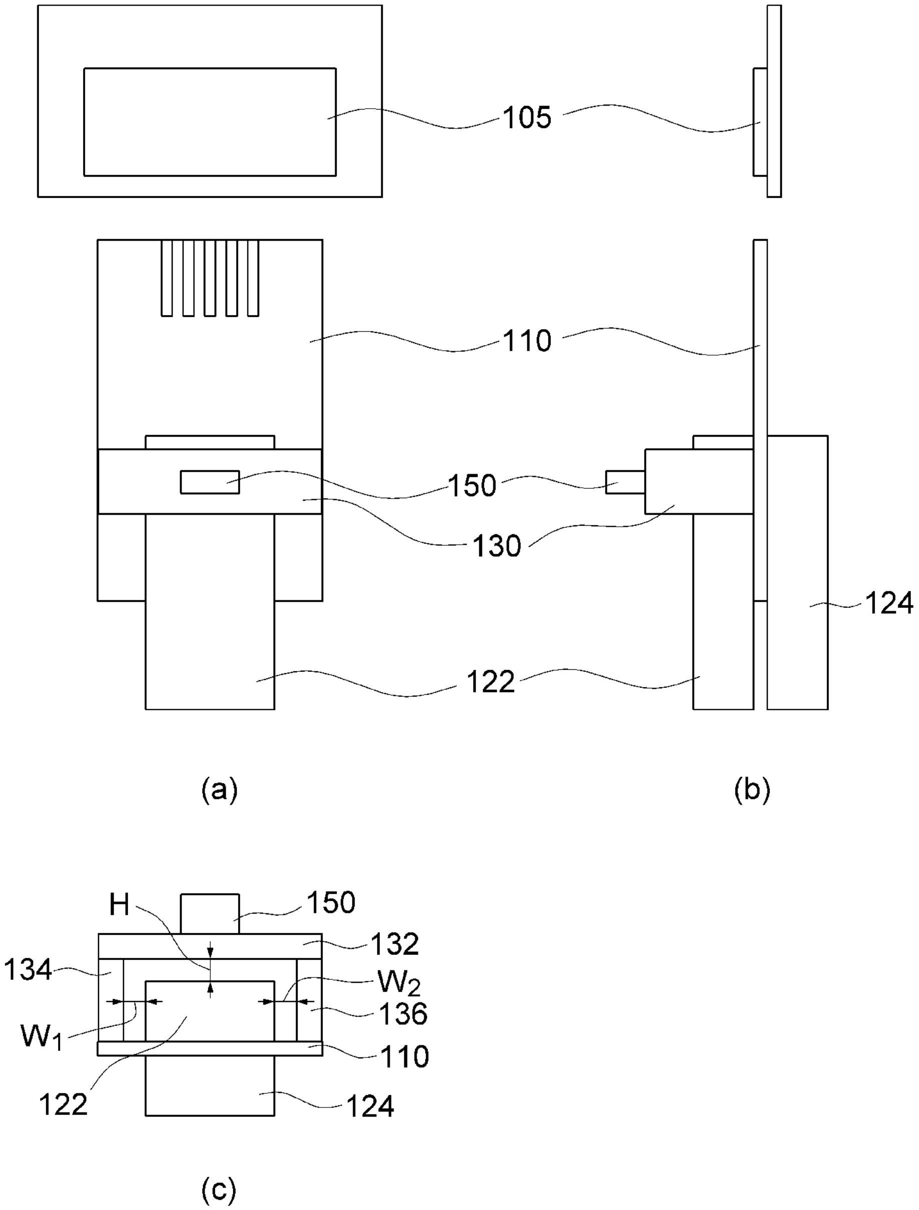
FIG. 2 includes a top plan view (a), a side view (b) and a cross-sectional view (c) of an embodiment a device with which a flexible member is insertable into a component.
Figure 3:
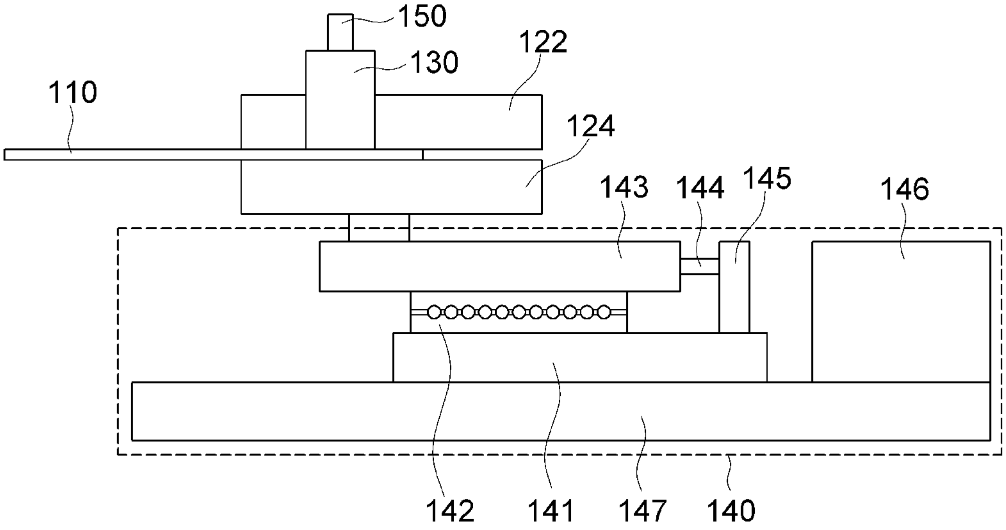
FIG. 3 is a cross-sectional view illustrating an embodiment of a transformation unit of the device of FIG. 1.
Figure 4:
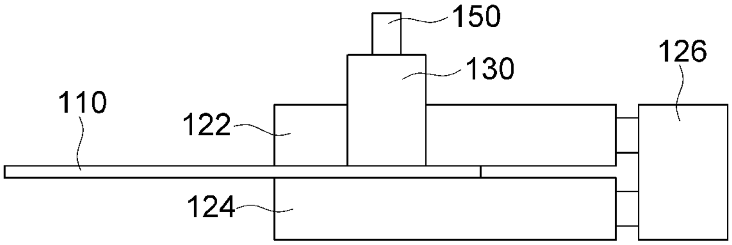
FIG. 4 is a cross-sectional view illustrating an embodiment of an actuator connected to a gripper of the device of FIG. 1.
Figure 5:
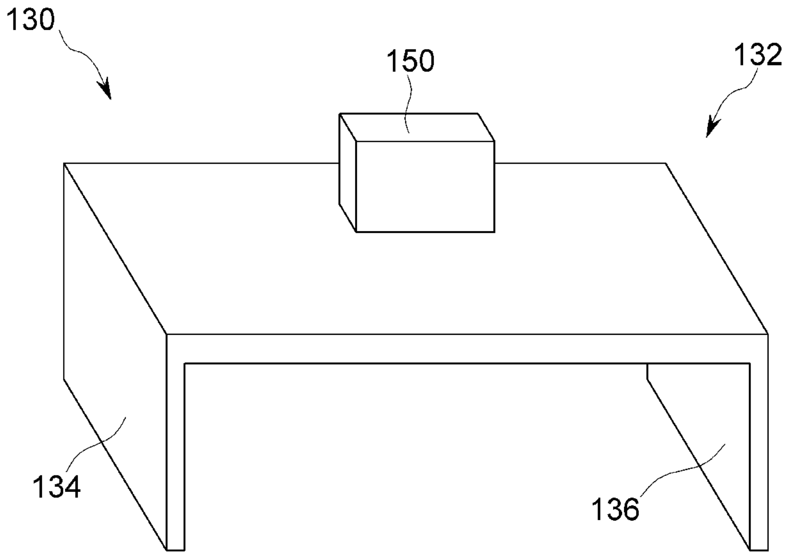
FIG. 5 is a perspective view illustrating an embodiment of a transportation unit of the device of FIG. 1.
Figure 6:
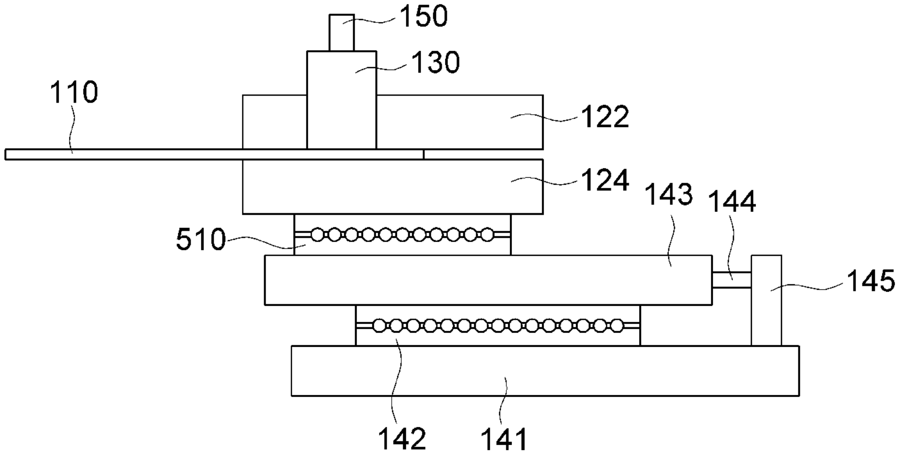
FIG. 6 is a cross-sectional view illustrating another embodiment of a transformation unit of the device of FIG. 1.
Figure 7:
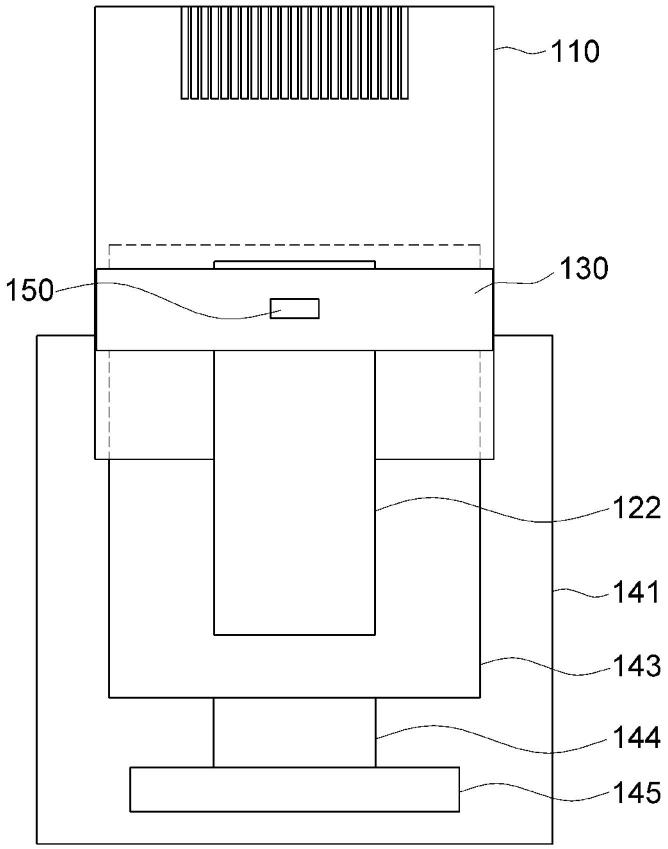
FIG. 7 is a top plan view illustrating an embodiment of a gripper coupled to a transformation unit and a transportation unit of the device of FIG. 1.

FIGS. 1 and 2 are views illustrating a device 100 with which a flexible member is insertable into a component. As hereinafter described, the device 100 may be used to insert a flexible printed circuit board ("FPCB") into a component, such as a connector. FIG. 1 is a cross-sectional view of a first side the device 100, FIG. 2 includes a top plan view (a), a side view (b) and a cross-sectional view (c) of an embodiment a device with which a flexible member is insertable into a component, FIG. 3 is a cross-sectional view illustrating an embodiment of a transformation unit of the device of FIG. 1, FIG. 4 is a cross-sectional view illustrating an embodiment of an actuator connected to a gripper of the device of FIG. 1, FIG. 5 is a perspective view illustrating an embodiment of a transportation unit of the device of FIG. 1, FIG. 6 is a cross-sectional view illustrating another embodiment of a transformation unit of the device of FIG. 1, and FIG. 7 is a top plan view illustrating an embodiment of a gripper coupled to a transformation unit and a transportation unit of the device of FIG. 1.

Referring to FIGS. 1 to 7, a device 100 with which a FPCB 110 is insertable into a connector 105, includes a gripper 120, a transformation unit 130, a transportation unit 140, and a first actuator 150. As applicable to an entirety of the present disclosure, the transformation unit 130 and the transportation unit 140 may otherwise be referred to as a deformer 130 and a transporter 140, respectively.

The device 100, the FPCB 110, the connector 105 and/or components thereof may be disposed in plane defined by a first direction and a second direction which crosses the first direction. A thickness of the device 100, the FPCB 110, the connector 105 and/or components thereof may extend along the third direction which crosses each of the first and second directions. In FIG. 2, for example, a thickness extends into the top plan view (a), extends horizontally in the side view (b) and vertically in the cross-sectional view (c). The horizontal and vertical directions of the top plan view (a) may variously represent the first and/or second directions, while the vertical direction in the side view (b) and the horizontal direction in the cross-sectional view (c) may variously represent the first and/or second directions.

The FPCB 110 is connectable to the connector 105 in an insertion manner.

The gripper 120 secures the FPCB 110. That is, the gripper 120 grips and secures a position of the FPCB 110 within the device 100 so that the FPCB 110 does not move during insertion of the FPCB 110 into the connector 105.

In such an embodiment, the gripper 120 may include a first pressing portion 122 that contacts the FPCB 110 at one surface thereof and a second pressing portion 124 that contacts the FPCB 110 at another surface thereof so as to face the first pressing portion 122 with the FPCB 110 therebetween. That is, the gripper 120 secures a position of the FPCB 110 by pressing the first pressing portion 122 against an upper surface of the FPCB 110, and pressing the second pressing portion 124 against a back surface of the FPCB 110 which is opposite to the upper surface thereof. Referring to the top plan view (a) of FIG. 2, for widths taken along the horizontal direction, a width of, the gripper 120 (represented by the first pressing portion 122) is less than a width of the FPCB 110.

The transformation unit 130 may apply a force to the FPCB 110 deform or bend the FPCB 110. In such an embodiment, the transformation unit 130 may include a slider 132 and the first actuator 150 as illustrated in FIG. 3.

The slider 132 may contact one surface of the FPCB 110 to apply a transformation force thereto, and the first actuator 150 may move the slider 132 in a direction perpendicular to the one surface of the FPCB 110 (e.g., vertical in the cross-sectional view (c) of FIG. 2).

The slider 132 may include a first stroke 134 that is spaced apart from the first pressing portion 122 and transforms a first side of the FPCB 110; and a second stroke 136 that is spaced apart from the first pressing portion 122 and transforms a second side of the FPCB 110 which is opposite to the first side thereof, along the horizontal direction in both the top plan view (a) and the cross-sectional view (c) of FIG. 2. The slider 132 may be in a form of a flat plate, and opposing ends of the flat plate of the slider 132 are respectively bent toward the first pressing portion 122 to form the first stroke 134 and the second stroke 136 spaced apart from each other. The first actuator 150 is positioned at an upper surface of the slider 132.

As shown along the horizontal direction in both the top plan view (a) and the cross-sectional view (c) of FIG. 2, the slider 132 has a width which is greater than a width of the gripper 120. That is, a distance from the first stroke 134 to the second stroke 136 of the slider 132 may be greater than a width of the first pressing portion 122 and/or the second pressing portion 124 of the gripper 120.

As shown along the horizontal direction in both the top plan view (a) and the cross-sectional view (c) of FIG. 2, a width of the slider 132 may be less than or substantially equal to a width of the FPCB 110. That is, the distance from the first stroke 134 to the second stroke 136 of the slider 132 may be less than or substantially equal to the width of the FPCB 110.

As illustrated in the cross-sectional view (c) of FIG. 2, a height difference H between the slider 132 and the first pressing portion 122 of the gripper 120 may be less than a distance W1 between the first stroke 134 and the first pressing portion 122 and/or a distance W2 between the second stroke 136 and the first pressing portion 122.

The first actuator 150 may be connected to the slider 132 which includes or defines each of the first stroke 134 and the second stroke 136. Actuation of the first actuator 150 may apply a substantially equal transformation force to each of the first stroke 134 and the second stroke 136. In an embodiment, actuation of the first actuator 150 moves the slider 132 together with each of the first stroke 134 and the second stroke 136.

The device 100 with which a FPCB 110 is insertable into a connector 105 may include a second actuator 126 connected to the gripper 120, as illustrated in FIG. 4.

The second actuator 126 may press the first pressing portion 122 against a first surface of the FPCB 110, and press the second pressing portion 124 against a second surface of the FPCB 110 which is opposite to the first surface thereof. That is, the second actuator 126 allows the first pressing portion 122 to contact the upper surface of the FPCB 110 and presses the first pressing portion 122 thereagainst, and allows the second pressing portion 124, facing the first pressing portion 122, to contact the back surface of the FPCB 110 and presses the second pressing portion 124 thereagainst.

Actuation of the second actuator 126 may apply a substantially equal force to the first pressing portion 122 and the second pressing portion 124 to secure the FPCB 110 therebetween within the device 100.

As illustrated in FIG. 3, the transportation unit 140 is connected to the gripper 120 and to the transformation unit 130, and actuation of the transportation unit 140 may transport the gripper 120 along to insert the FPCB 110 into the connector 105. The transportation unit 140 (indicated with a dotted line box in FIG. 3) may include a transportation frame 141, a first linear guide 142, a base frame 143, a transportation buffer 144, and a driver 146, as illustrated in FIG. 5.

Under actuation and control of the driver 146, the transportation frame 141 may be movable toward and away from the connector 105 along a movement base 147 which is connected to the driver 146. The transportation frame 141 and the base frame 143 may be movably coupled to each other. That is, the transportation frame 141 may be coupled to the base frame 143 through the first linear guide 142 at a side thereof. The transportation frame 141 may be slidably coupled to the base frame 143 through the first linear guide 142.

The transportation frame 141 may further include a support member 145 protruding from a side thereof, and the transportation buffer 144 may be secured between an end portion of the base frame 143 and the support member 145.

The gripper 120 and the transformation unit 130 may be secured on a same side of the base frame 143. Accordingly, when the base frame 143 moves toward the connector 105 in a sliding manner, the gripper 120 having the FPCB 110 secured thereto and the transformation unit 130 that transforms a part of the FPCB 110 to be bent, may each move toward the connector 105 in a sliding manner together with the base frame 143.

The first linear guide 142 may couple the base frame 143 and the transportation frame 141 to each other, so that the transportation frame 141 is movable in a sliding manner with respect to the base frame 143. That is, when the insertion of the FPCB 110 to the connector 105 is completed by the sliding movement of the transportation frame 141 relative to the base frame 143, transportation of the base frame 143 is stopped, and the first linear guide 142 may allow the transportation frame 141 to move in a sliding manner with respect to the base frame 143. In an embodiment, while maintaining a position of the base frame 143 which is stopped, the transportation frame 141 may be movable in a sliding manner with respect to the base frame 143 by the first linear guide 142 disposed therebetween.

The transportation buffer 144 may be disposed between the transportation frame 141 (at the support member 145), and the base frame 143, to buffer a transportation force of the transportation frame 141. The transportation buffer 144 may include a spring or a rubber material. The transportation buffer 144 may include a hydraulic actuator or an air pressure actuator.

The driver 146 may provide a driving force to the transportation frame 141 by using the movement base 147. That is, the driver 146 may control or actuate the movement base 147 to provide the driving force to the transportation frame 141 which moves the transportation frame 141. In another embodiment, the driver 146 may provide a driving force to the transportation frame 141 without using the movement base 147. In an embodiment, for example, the driver 146 may be implemented as a robot arm which provides a driving force to the transportation frame 141 without providing a force through the movement base 147. Even where the driver 146 provides a driving force to the transportation frame 141 without using movement of the movement base 147, the transportation frame 141 may still move along the movement base 147 in a transportation direction (e.g., horizontal in FIG. 5).

In an embodiment, the transportation unit 140 may further include a second linear guide 510 with which the base frame 143, to which the gripper 120 and the transformation unit 130 are secured, is movable in a sliding manner.

The second linear guide 510 may be disposed between the gripper 120 and the base frame 143, and may couple the gripper 120 and the base frame 143 to each other, while maintaining the secured state of the transformation unit 130 relative to the base frame 143.

The transportation buffer 144 that is coupled to a side of the base frame 143 and the support member 145 of the transportation frame 141 may have a rigidity less than a shear strength of the FPCB 110. As used herein, the shear strength of the FPCB 110 means a strength that causes, when the FPCB 110 receives a compressive force, transformation or deformation of the FPCB 110 in a direction perpendicular to the compressive force, and the rigidity of the transportation buffer 144 means a minimum rigidity at which the transportation buffer 144 causes displacement in a direction substantially the same as a direction of an external force applied thereto.

The first linear guide 142 and/or the second linear guide 510 may be movable in a direction parallel to an inserting direction of the FPCB 110, such as being parallel to the transportation direction (e.g., horizontal in FIGS. 5 and 6). A force required for the movement in the direction parallel to the inserting direction of the FPCB 110 may be generated by an actuator such as a spring or an air cylinder of the first linear guide 142 and/or the second linear guide 510.

Referring to the top plan view in FIG. 7, the FPCB 110 may be pressed and secured by the first pressing portion 122 located at the upper surface of the FPCB 110, and may be transformed or deformed by the transformation unit 130, located on the first pressing portion 122, such that width-directional opposite end portions of the FPCB 110 may be bent.

Referring to FIGS. 1 to 4 and FIG. 7, for example, the gripper 120 and the transformation unit 130 are secured to the base frame 143, and the base frame 143 is coupled to the transportation frame 141 through the first linear guide 142.

A width of the first pressing portion 122 may be less than the width of the FPCB 110, and a width of the transformation unit 130 may be less than or substantially equal to the width of the FPCB 110.

The width of the FPCB 110 may be greater than or substantially equal to a width of the base frame 143.

A length direction of the FPCB 110 in FIG. 7 is taken along the vertical direction, and a width direction is taken along the horizontal direction. An intermediate point of the FPCB 110 is defined along the length direction thereof, between a distal end (uppermost end in FIG. 7) of the FPCB 110 and an innermost end (lowermost end in FIG. 7). Along the length direction of the FPCB 110, the gripper 120 may place the first pressing portion 122 on the upper surface of the FPCB 110 such that a distal end of the first pressing portion 122 corresponds to the intermediate point of the FPCB 110 or less from the innermost end of the FPCB 110, and may place the second pressing portion 124 on the back surface of the FPCB 110 such that a distal end of the second pressing portion 124 corresponds to the intermediate point of the FPCB 110 or less from the innermost of the FPCB 110.

A fore-end portion (e.g., uppermost edge in FIG. 7) of the transformation unit 130 may be located corresponding to a position substantially the same as or at a distance from a fore-end portion (e.g., distal end) of the first pressing portion 122 disposed on the upper surface of the FPCB 110.

The distal ends of the first pressing portion 122 and of the second pressing portion 124 corresponding to the intermediate point of the FPCB 110 or less, and the fore-end portion of the transformation unit 130 corresponding to distal ends, disposes a length portion of the FPCB 110 extended further the distal ends and the transformation unit 130 to be exposed outside the distal ends and the transformation unit 130. In FIG. 7, for example, the length portion disposed outside the gripper 120 and the transformation unit 130 includes circuit elements (indicated as a group of vertically-parallel bars at the distal end of the FPCB 110 in FIG. 7). This length portion of the FPCB may correspond to a portion of the FPCB 110 which will be inserted into a connector 105.

Figure 8:
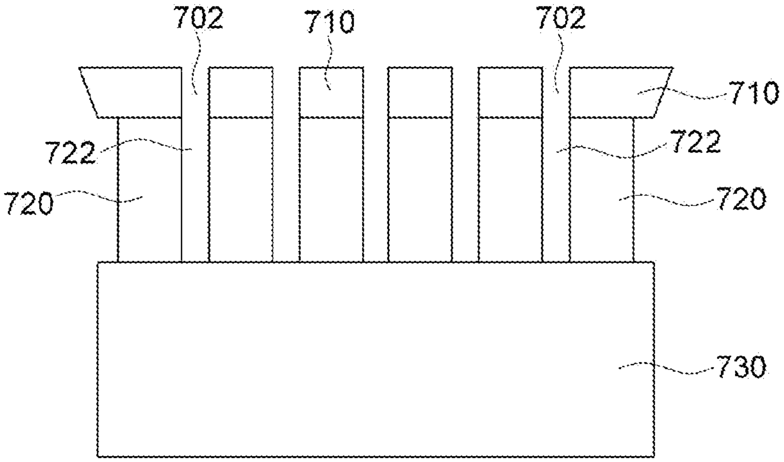
FIG. 8 is a top plan view illustrating an embodiment of a gripper of a device, in a vacuum scheme.
Figure 9:
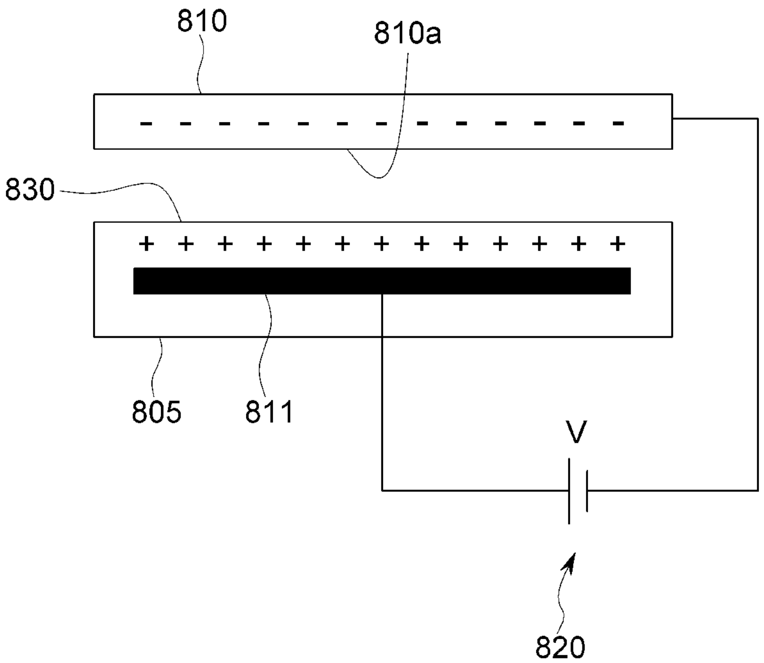
FIG. 9 is a view illustrating an embodiment of a gripper of a device, in an electrostatic scheme.

In an embodiment, the gripper 120 may include a holder for securing the FPCB 110 in a position relative to the gripper 120. The holder may hold and secure the FPCB 110 in a vacuum scheme as illustrated in FIG. 8, and an electrostatic scheme as illustrated in FIG. 9. As applicable to an entirety of the present disclosure, a holding unit may otherwise be referred to as a holder.

FIG. 8 is a view illustrating an embodiment of a gripper in a vacuum scheme.

Referring to FIG. 8, the gripper 120 according to an embodiment may include a pad portion 710, an elastic portion 720, and a vacuum generator 730.

The pad portion 710 may have or define an inlet 702 provided in plurality and with which air is moved to create a vacuum force at the pad portion 710.

The elastic portion 720 may have or define a communication path 722 which is in fluid or air communication with the inlet 702, and may buffer movement of the pad portion 710 due to a holding force.

The vacuum generator 730 may generate a vacuum and introduce and/or remove air through the inlet 702 and the communication path 722. The vacuum generator 730 may be in fluid and/or air communication with the inlet 702 and the communication path 722.

Operation of the gripper 120 of the above-described structure in FIG. 8 generates a vacuum in the vacuum generator 730, and an air is moved through the inlet 702 and the communication path 722. The FPCB 110 is held relative to the pad portion 710 according to the inflow of the air through the inlet 702 and the communication path 722. That is, a position of the FPCB 110 held against the pad portion 710 is maintained by the gripper 120.

In an embodiment the structure in FIG. 8 may be applied to one or more of the first pressing portion 122 and the first pressing portion 122, without being limited thereto.

FIG. 9 is a view illustrating an embodiment of a gripper in an electrostatic scheme.

Referring to FIG. 9, the gripper 120 may include a holding member 805, a holding substrate 810, and a holding power unit 820.

The holding member 805 may include a holding surface 830 on one side, and a holding electrode 811 on another side.

The holding substrate 810 may be spaced apart from the holding member 805, and may be charged with electric charges having a polarity opposite to a polarity of the holding electrode 811. In an embodiment, for example, when a positive charge (+) is generated at the holding electrode 811, a negative charge (−) may be generated at the holding substrate 810. A holding surface 810*a* of the holding substrate 810 may face the holding surface 830 of the holding member 805.

The holding power unit 820 may apply a predetermined voltage between the holding substrate 810 and the holding member 805.

In an embodiment, the holder having the above-described structure may place the FPCB 110 between the holding member 805 and the holding substrate 810, and the holding power unit 820 applies a predetermined voltage between the holding electrode 811 and the holding substrate 810.

Accordingly, a positive charge is generated in the holding electrode 811 of the holding member 805, and a negative charge is generated in the holding substrate 810.

The holding surface 830 of the holding member 805 and the holding substrate 810 are constrained by a Coulomb force, and thus the holding substrate 810 is secured relative to the holding surface 830 of the holding member 805 by an electrostatic force.

Accordingly, the FPCB 110 located between the holding member 805 and the holding substrate 810 is held relative to the holder in the described above manner. In an embodiment, the holding member 805 and the holding substrate 810 may correspond to the first pressing portion 122 and the first pressing portion 122, without being limited thereto.

Figure 10:
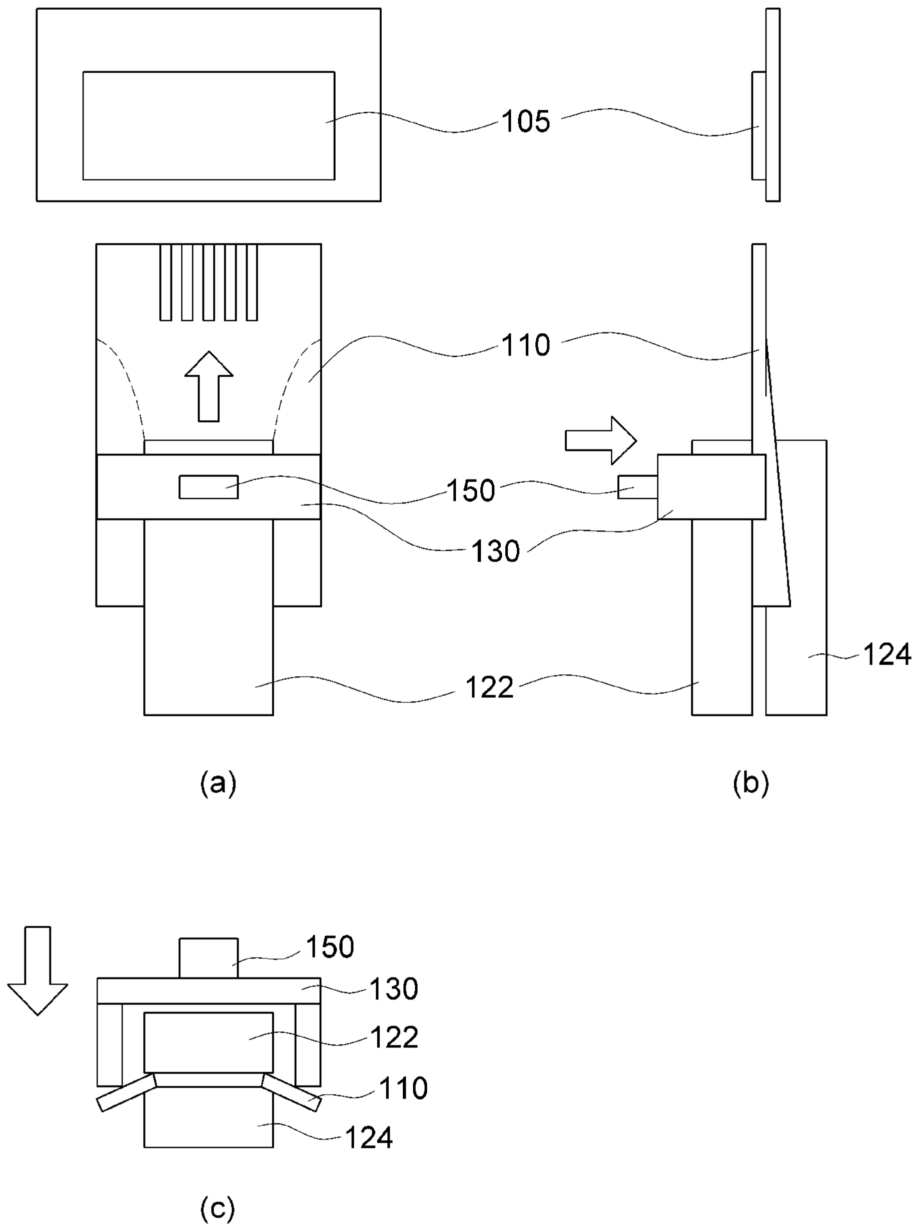
FIG. 10 includes a top plan view (a), a side view (b) and a cross-sectional view (c) of an embodiment of an deformation operation by a device with which a flexible member is insertable into a component.
Figure 11:
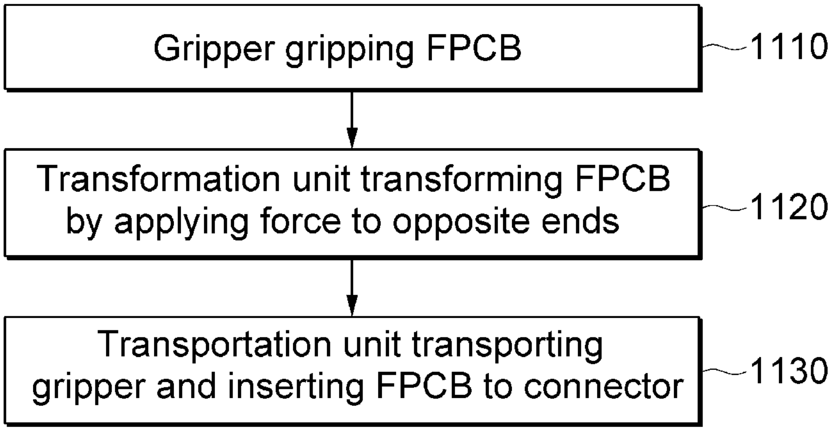
FIG. 11 is a flowchart illustrating an embodiment of a method of inserting a flexible member into a connector, using the device of FIG. 1.

FIG. 10 includes a top plan view (a), a side view (b) and a cross-sectional view (c) of an embodiment of an deformation operation by a device with which a flexible member is insertable into a component, and FIG. 11 is a flowchart illustrating an embodiment of a method of inserting a FPCB 110 into a connector 105. For convenience of illustrations, main components of the device 100 are shown in the views (a), (b) and (c) of FIG. 10, while other components such as the transportation unit 140 (see FIG. 1) are omitted.

Referring to FIGS. 10 and 11, the gripper 120 of the device 100 firstly secures the FPCB 110 (1110).

That is, the gripper 120 secures the FPCB 110 by pressing the first pressing portion 122 against the upper surface of the FPCB 110 and pressing the second pressing portion 124 against the back surface of the FPCB 110, with a force provided from the second actuator 126 (see FIG. 4). The first pressing portion 122 and the second pressing portion 124, facing each other, contact the upper surface and the back surface of the FPCB 110, respectively.

In such an embodiment, while the FPCB 110 secured by the gripper 120, the FPCB 110 is spaced apart from the connector 105 by a predetermined distance (vertical in the top plan view (a) and the side view (b) of FIG. 10), and the gripper 120 having the FPCB 110 secured thereto and the transformation unit 130 are secured to the base frame 143 at a same side thereof (see FIG. 3).

The width of the first pressing portion 122 located at the upper surface of the FPCB 110 may be less than the width of the FPCB 110. The width of the transformation unit 130 may be less than or substantially equal to the width of the FPCB 110.

Referring again to FIG. 3, the base frame 143 is coupled to the transportation frame 141 through the first linear guide 142, and the transportation buffer 144 is coupled between a side end portion of the base frame 143 and the support member 145 of the transportation frame 141.

As described above with respect to FIG. 7, the first pressing portion 122 may be positioned up to an intermediate point of the FPCB 110 or less along the length direction of the FPCB 110, and the second pressing portion 124 may be positioned up to a position substantially the same as or less than the first pressing portion 122 along the length direction of the FPCB 110.

Referring to the cross-sectional view (c) in FIG. 2, a height difference between the transformation unit 130 and the gripper 120 may be less than a distance between the first pressing portion 122 of the gripper 120 and one or both of the first stroke 134 and the second stroke 136 of the transformation unit 130. Referring to the cross-sectional views (c) in FIG. 2 and FIG. 10, a width portion of the FPCB 110 extends further than edges of the gripper 120 to be exposed outside the gripper 120. This width portion of the FPCB 110 may correspond to a portion of the FPCB 110 which will be bent along a bending axis extended along a length direction of the FPCB 110. Referring to the top plan view (a) and the side view (b) in FIG. 10, the bending axis (dotted line in top plan view (a)) does not extend completely to the distal end of the FPCB 110 and curves towards edges of the FPCB 110. A fore-end portion of the FPCB 110 from a distal end of the bending axis to the distal end of the FPCB may remain substantially flat (e.g., not bent). That is, actuation of the first actuator 150 disposes opposing edge portions of a back-end portion of the FPCB 110 bent relative to a plane in which a remainder (e.g., between the first pressing portion 122 and the second pressing portion 124) of the back-end portion of the FPCB 110 is disposed. The opposing edge portions are also disposed bent relative to a plane in which a fore-end portion of the FPCB 110 is disposed.

While the width portion of the FPCB 110 extends further than edges of the gripper 120 to be exposed outside the gripper 120, the transformation unit 130 transforms a portion of the FPCB 110 (1120).

The slider 132 of the transformation unit 130 moves toward the upper surface of the first pressing portion 122 of the gripper 120, and applies a force to the width portion of the FPCB 110 so that the width portion of the FPCB 110 may be bent. The width portion of the FPCB 110 which is bent, may otherwise be referred to as a back-end portion of the FPCB 110.

In an embodiment, actuation of the transformation unit 130 by a force provided from the first actuator 150 moves the slider 132 in a perpendicular direction (arrows in the side view (b) and the cross-sectional view (c) of FIG. 10) with respect to the FPCB 110 to reach the first pressing portion 122, so that there is no height difference between the plate of the slider 132 and the first pressing portion 122. Accordingly, as illustrated in the cross-sectional view (c) of FIG. 10, the first stroke 134 and the second stroke 136 of the slider 132 contact the width portion of the FPCB 110 and apply a force to opposite edge portions of the FPCB 110 so that the opposite edge portions of the FPCB 110 are transformed by being bent. The FPCB 110 secured by the gripper 120 may initially be disposed flat (see the cross-sectional view (c) of FIG. 2), that is, in a single plane. Under application of the force to the opposite edge portions of the FPCB 110, the FPCB 110 secured by the gripper 120 is essentially disposed in three-dimensions to have opposite edge portions of the FPCB 110 bent about opposing edges of the gripper 120.

Accordingly, although the FPCB 110 has a relatively small thickness, since opposite edge portions of a back-end portion of the FPCB 110 are transformed and bent by the transformation unit 130, the FPCB 110 may become substantially taut without wrinkles. Accordingly, the FPCB 110 which is substantially taut may achieve a rigidity along an inserting direction (e.g., along a length of the FPCB 110) and may be applied with a sufficient inserting force for inserting the FPCB 110 into the connector 105.

While the gripper 120 including the FPCB 110 secured thereto and having a rigidity along an inserting direction thereof, and the transformation unit 130, are each secured to the base frame 143, the transportation unit 140 transports the gripper 120 together with the FPCB 110 secured thereto, along the inserting direction (arrow in the top plan view (a) of FIG. 10) to insert the FPCB 110 into the connector 105 (1130).

That is, in the transportation unit 140, as the driver 146 provides a driving force to the transportation frame 141, the transportation frame 141 together with the gripper 120 having the FPCB 110 secured thereto, slides toward the connector 105, as illustrated the arrow in the top plan view (a) in FIG. 10. In such an embodiment, and referring to the transportation unit 140 in FIG. 3 and/or FIG. 6, the base frame 143 slidably coupled to the transportation frame 141 slides toward the connector 105 together with the transportation frame 141, and the gripper 120 and the transformation unit 130 secured to the base frame 143 also slide toward the connector 105. Accordingly, a distal end of the FPCB 110 secured by the gripper 120 and/or held relative to the holder (see FIGS. 8 and 9) is inserted into the connector 105.

In such an embodiment, the first actuator 150 may allow the slider 132 of the transformation unit 130 to be spaced apart from the FPCB 110 by such a range that a height difference H between the transformation unit 130 and the gripper 120 is less than a distance W1 between the first stroke 134 of the transformation unit 130 and the first pressing portion 122 of the gripper 120. That is, the first actuator 150 moves the slider 132 away from the FPCB 110, as the fore-end portion of the FPCB 110 which is initially inserted into the connector 105, approaches an insertion end position of the connector 105. In such a case, a separation distance between the slider 132 and the FPCB 110 is less than the distance W1 between the first pressing portion 122 and the first stroke 134.

In addition, the first actuator 150 may allow the slider 132 of the transformation unit 130 to be spaced apart from the FPCB 110 by such a range that the height difference H between the transformation unit 130 and the gripper 120 is less than a distance W2 between the second stroke 136 of the transformation unit 130 and the first pressing portion 122 of the gripper 120. That is, the first actuator 150 moves the slider 132 away from the FPCB 110, as the fore-end portion of the FPCB 110 which is initially inserted into the connector 105, approaches the insertion end position of the connector 105. In such a case, the separation distance between the slider 132 and the FPCB 110 is less than the distance between the first pressing portion 122 and the second stroke 136.

When the FPCB 110 secured to the gripper 120 is inserted into the connector 105 and the fore-end portion of the FPCB 110 reaches the insertion end position in the connector 105, insertion of the FPCB 110 into the connector 105 is completed. When the insertion is completed, movement of the FPCB 110 is stopped by reaching the insertion end position of the connector 105. In an embodiment, a physical feature of the connector 105 may define the insertion end position, without being limited thereto.

While the FPCB 110 has stopped moving, sliding movement of the gripper 120 that secures the FPCB 110 also stops, and sliding movement of the transformation unit 130 that has transformed a portion of the FPCB 110 to be bent also stops.

In such an embodiment, while the sliding movement of the gripper 120 and the transformation unit 130 is stopped, the transportation frame 141 continues to slide toward the connector 105 in accordance with an inertia force due to the sliding movement toward the connector 105. However, sliding movement of the base frame 143 to which the gripper 120 and the transformation unit 130 having the stopped sliding movement are secured, stops together with the gripper 120 and the transformation unit 130. The first linear guide 142 allows continued movement the transportation frame 141 in a sliding manner with respect to the base frame 143 that has stopped moving.

The transportation buffer 144 coupled between an end portion of the base frame 143 and the support member 145 of the transportation frame 141 buffers a transportation force of the transportation frame 141 which is generated in accordance with the continued sliding movement toward the connector 105 described above. That is, the transportation buffer 144 buffers the transportation force of the transportation frame 141 which is generated when the transportation frame 141 continues to move in the sliding manner with respect to the base frame 143 that has stopped moving, so that an insertion force that is met or exceeded to insert the FPCB 110 into the connector 105 is less than a transformation force that is applied to the FPCB 110 by actuation of the first actuator 150 to bend the FPCB 110.

A compressive force is applied to the FPCB 110 when the FPCB 110 contacts the insertion end position of the connector 105. A shear strength of the FPCB 110 causes transformation or deformation of the FPCB 110 in a direction perpendicular to the compressive force. In an embodiment, the transportation buffer 144 may have a rigidity less than the shear strength of the FPCB 110 that causes transformation of the FPCB 110 in the direction perpendicular to the compressive force received by the FPCB 110 when the FPCB 110 contacts the insertion end position in the connector 105.

Taken along a same direction, a sliding force which is met or exceeded for sliding the transportation frame 141 with respect to the base frame 143 by using the first linear guide 142 may be less than a transformation force of the FPCB 110 at a point in time at which insertion of the FPCB 110 ends, and may be greater than an insertion force which is met or exceeded to insert the FPCB 110 into the connector 105. Each of the sliding force, the transformation force and the insertion force may include a component extended along the inserting direction (e.g., the vertical direction in the top plan view (a) and the side view (b) of FIG. 10, and the horizontal direction in each of FIGS. 1, 3 and 6, for example).

Accordingly, even though the transportation frame 141 continues to slide according to the continued sliding movement toward the connector 105 described above and overruns a position of the FPCB 110 toward a distal end thereof along the inserting direction after insertion of the FPCB 110 into the connector 105 ends, the FPCB 110 may not be deformed or damaged by the continued sliding of the transportation frame 141 to which the gripper 120 and the transformation unit 130 having the stopped sliding movement are secured.

Figure 12A:
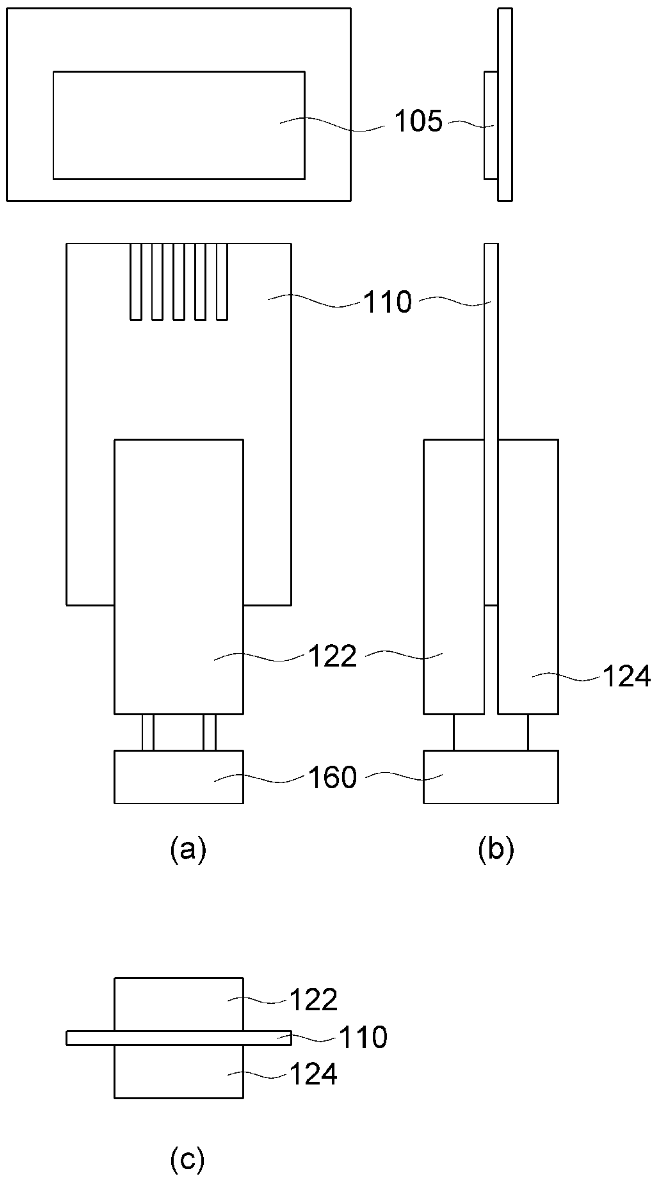
FIGS. 12A and 12B each includes a top plan view (a), a side view (b) and a cross-sectional view (c) of another embodiment of an insertion operation by a device with which a flexible member is insertable into a component.
Figure 12B:
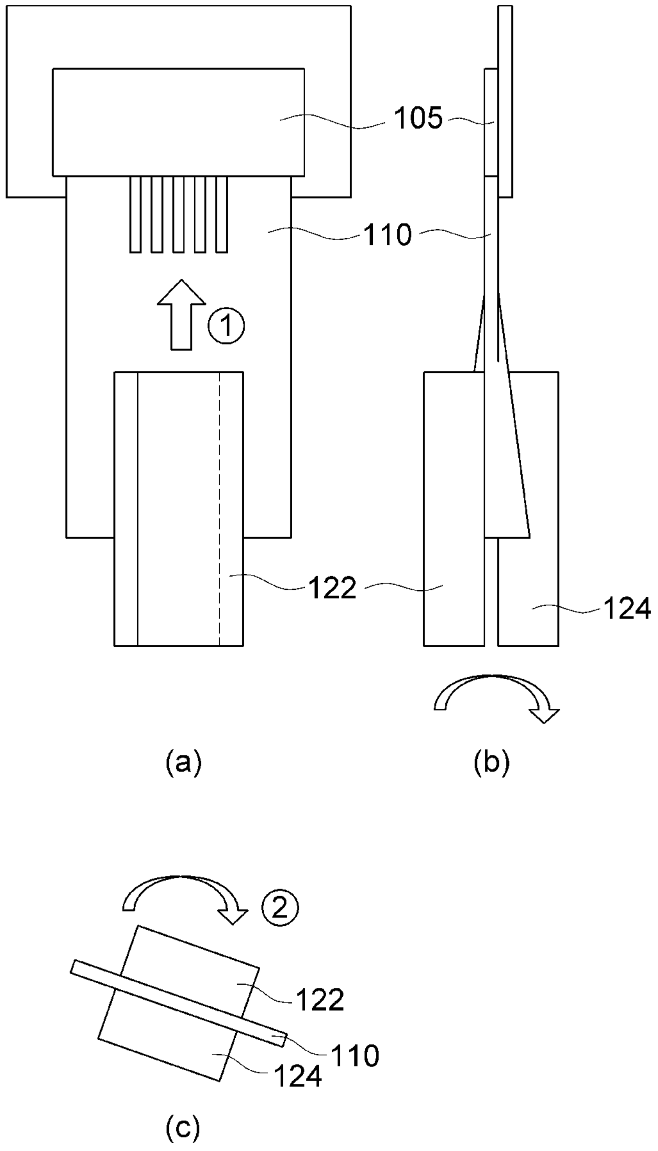

FIGS. 12A and 12B each includes a top plan view (a), a side view (b) and a cross-sectional view (c) of another embodiment of an insertion operation by a device with which a flexible member is insertable into a component.

Referring to FIGS. 12A and 12B, a device with which a FPCB 110 is insertable into a connector 105 includes a gripper 120, a transportation unit 140 and a rotation unit 160. As applicable to an entirety of the present disclosure, the rotation unit 160 may otherwise be referred to as a rotator 160.

As shown in the top plan view (a), the side view (b) and the cross-sectional view (c) of FIG. 12A, the gripper 120 secures the FPCB 110. That is, the gripper 120 may secure the FPCB 110 by pressing a first pressing portion 122 against an upper surface of the FPCB 110 and pressing a second pressing portion 124 against a back surface of the FPCB 110.

The transportation unit 140 (see FIGS. 1, 3 and 6, for example) is connected to the gripper 120 and transports the gripper 120, to insert a distal end of the FPCB 110 into the connector 105.

The rotation unit 160 may rotate the gripper 120 together with the FPCB 110 secured thereto, about a rotation axis, by a predetermined angle from an initial position of the gripper 120. In such an embodiment, the rotation unit 160 may include, for example, a motor that provides a rotational force to rotate the gripper 120, and may be connected to the first pressing portion 122 and/or the second pressing portion 124 of the gripper 120. Accordingly, the rotation unit 160 may rotate the first pressing portion 122 together with the second pressing portion 124 of the gripper 120 and the FPCB 110 secured thereto, in a clockwise or counterclockwise direction about the rotation axis.

While a fore-end portion of the FPCB 110 is initially inserted into an inlet of the connector 105 (①, as illustrated in the top plan view (a) of FIG. 12A), the rotation unit 160 rotates the gripper 120 together with the FPCB 110 secured thereto, in a clockwise direction by a predetermined angle (②, as illustrated in the side view (b) and the cross-sectional view (c) of FIG. 12B). With the rotation of the gripper 120 in a clockwise direction by a predetermined angle, a top left edge of the first pressing portion 122 shown in the cross-sectional view (c) of FIG. 12B has moved from the leftmost vertical solid line edge in the top plan view (a), to the second vertical solid line in the top plan view (a) of FIG. 12B. Similarly, a bottom left edge of the second pressing portion 124 shown in the cross-sectional view (c) of FIG. 12B has moved from the rightmost vertical solid line edge in the top plan view (a), to the vertical dotted line in the top plan view (a) of FIG. 12B.

As shown in the side view (b) of FIG. 12B, rotation of the gripper 120 rotates a back-end portion of the FPCB 110 at the predetermined angle in the clockwise direction to be bent at the predetermined angle, but the fore-end portion of the FPCB 110 may remain in a flat shape up to the distal end of the FPCB 110 positioned within the connector 105. That is, rotation of the gripper 120 disposes opposing edge portions of the back-end portion of the FPCB 110 bent relative to a plane in which a remainder (e.g., between the first pressing portion 122 and the second pressing portion 124) of the back-end portion of the FPCB 110 is disposed. The opposing edge portions are also disposed bent relative to a plane in which the fore-end portion of the FPCB 110 is disposed.

Accordingly, although the FPCB 110 has a relatively small thickness, a back-end portion of the FPCB 110 is bent by rotation of the gripper 120, the FPCB 110 may become substantially taut without wrinkles. Accordingly, the FPCB 110 which is substantially taut may achieve a rigidity along an inserting direction (e.g., along a length of the FPCB 110) and may be applied with a sufficient inserting force for inserting the FPCB 110 into the connector 105.

While the gripper 120 and the FPCB 110 having the back-end portion thereof which is bent at the predetermined angle in accordance with the rotation of the gripper 120 are each in a state of being rotated by the predetermined angle, the transportation unit 140 continuously inserts the FPCB 110 to a back-end portion of the connector 105, e.g., an insertion end position in the connector 105.

The continuous insertion of the FPCB 110 to the back-end portion of the connector 105 may include the rotation unit 160 counter-rotating the gripper 120 having the FPCB 110 secured thereto, until the fore-end portion of the FPCB 110 initially inserted into the inlet of the connector 105 reaches the insertion end position in the connector 105, so that a bent state of the back-end portion of the FPCB 110 is restored into a flat state.

When the fore-end portion of the FPCB 110 reaches the insertion end position in the connector 105, the insertion of the FPCB 110 into the connector 105 is completed. While the insertion of the FPCB 110 into the connector 105 is completed, the gripper 120 respectively moves the first pressing portion 122 and the second pressing portion 124 away from the FPCB 110, thereby releasing the FPCB 110 and disposing the FPCB 110 in a secure connection with the connector 105.

As such, in one or more of the device with which a FPCB is inserted into a connector, and a method thereof according to the invention, the rigidity of the FPCB may be secured in the inserting direction during insertion of the FPCB into the connector such that insertion of the FPCB into the connector may be simplified.

As set forth hereinabove, in one or more embodiment of the device with which a FPCB is inserted into a connector according to the invention, the FPCB may be transformed to secure rigidity thereof in the inserting direction, such that a sufficient insertion force may be applied to the FPCB during insertion of the FPCB into the connector.

While the invention has been illustrated and described with reference to the embodiments thereof, it will be apparent to those of ordinary skill in the art that various changes in form and detail may be made thereto without departing from the spirit and scope of the invention.

What is claimed is:

1. A device for inserting a flexible printed circuit board into a connector, the device comprising:

a gripper to which the flexible printed circuit board is securable;

a deformer movably connected to the gripper; and a transporter connected to the gripper and the deformer, wherein movement of the deformer relative to the gripper which has the flexible printed circuit board secured thereto, applies a transformation force from the deformer to a portion of the flexible printed circuit board to bend the portion of the flexible printed circuit board about edges of the gripper, and transportation of the transporter transports the gripper together with the flexible printed circuit board which has the portion of the flexible printed circuit board which is bent about the edges of the gripper, toward the connector, and inserts the flexible printed circuit board into the connector.

2. The device of claim 1, wherein the gripper comprises a first pressing portion which faces a second pressing portion, and securing of the flexible printed circuit board by the gripper disposes:

the first pressing portion contacting a first surface of the flexible printed circuit board; and a second pressing portion contacting a second surface of the flexible printed circuit board which is opposite to the first surface.

3. The device of claim 2, wherein along a same direction, the gripper has a width less than a width of the flexible printed circuit board.

4. The device of claim 2, further comprising a first actuator connected to the gripper, wherein actuation of the first actuator presses the first pressing portion against the first surface of the flexible printed circuit board, and presses the second pressing portion against the second surface of the flexible printed circuit board.

5. The device of claim 4, wherein the first actuator applies an equal force to the first pressing portion and the second pressing portion.

6. The device of claim 2, wherein the deformer comprises:

a slider movable with respect to the gripper; and a first actuator connected to the slider, actuation of the first actuator moves the slider relative to the gripper which has the flexible printed circuit board secured thereto, and movement of the slider by the first actuator contacts the slider with the portion of the flexible printed circuit board and applies the transformation force from the deformer to the portion of the flexible printed circuit board to bend the portion of the flexible printed circuit board about the edges of the gripper.

7. The device of claim 6, wherein along a same direction, the slider has a width greater than a width of the gripper.

8. The device of claim 6, wherein along a same direction, a width of the slider is less than or equal to a width of the flexible printed circuit board.

9. The device of claim 6, wherein the slider comprises:

a first stroke and a second stroke which face each other with respect to each of the first pressing portion and the second pressing portion of the gripper disposed therebetween, wherein the first stroke is spaced apart from the first pressing portion and the second stroke is spaced apart from the second pressing portion, the movement of the slider by the first actuator moves the first stroke together with the second stroke, relative to the gripper which has the flexible printed circuit board secured thereto, movement of the first stroke by the first actuator contacts the first stroke with a first side of the portion of the flexible printed circuit board and applies the transformation force to the first side of the portion of the flexible printed circuit board to bend the first side of the portion of the flexible printed circuit board about a first edge of the gripper, and movement of the second stroke by the first actuator contacts the second stroke with a second side of the portion of the flexible printed circuit board which is opposite to the first side thereof and applies the transformation force to the second side of the portion of the flexible printed circuit board to bend the second side of the portion of the flexible printed circuit board about a second edge of the gripper which is opposite to the first edge thereof.

10. The device of claim 9, wherein a height difference between the slider and the first pressing portion, is less than a distance between the first stroke and the first pressing portion or a distance between the second stroke and the first pressing portion.

11. The device of claim 9, wherein the transformation force applied from the first stroke is equal to the transformation force applied from the second stroke.

12. The device of claim 2, wherein the first pressing portion or the second pressing portion of the gripper comprises a holder with which the flexible printed circuit board is secured to the gripper.

13. The device of claim 12, wherein the holder secures the flexible printed circuit board to the gripper by using a vacuum force or an electrostatic force.

14. The device of claim 1, wherein the transporter comprises:

a base frame coupled to the gripper and the deformer;

a transportation frame movably coupled to the base frame;

a first linear guide which slidably couples the base frame and the transportation frame to each other;

a transportation buffer connected between the transportation frame and the base frame; and a driver with which a driving force is provided to the transportation frame.

15. The device of claim 14, wherein the transporter further comprises:

a second linear guide which slidably couples the base frame to the gripper.

* * * * *